(12) United States Patent
Huels et al.

(10) Patent No.: US 11,111,982 B2
(45) Date of Patent: Sep. 7, 2021

(54) METHOD FOR MAKING A TENSION MEMBER

(71) Applicant: ContiTech Transportbandsysteme GmbH, Hannover (DE)

(72) Inventors: Achim Huels, Barsinghausen (DE); Michael Moeschen-Siekmann, Noerten-Hardenberg (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 610 days.

(21) Appl. No.: 15/977,819

(22) Filed: May 11, 2018

(65) Prior Publication Data
US 2018/0259036 A1    Sep. 13, 2018

Related U.S. Application Data

(63) Continuation of application No. PCT/EP2016/069551, filed on Aug. 18, 2016.

(30) Foreign Application Priority Data

Nov. 12, 2015 (DE) ...................... 10 2015 222 272.1

(51) Int. Cl.
*B29C 70/68* (2006.01)
*F16G 11/04* (2006.01)
(Continued)

(52) U.S. Cl.
CPC .............. *F16G 11/04* (2013.01); *B29C 70/72* (2013.01); *B29D 29/00* (2013.01); *D07B 7/145* (2013.01);
(Continued)

(58) Field of Classification Search
CPC ........ B29C 70/72; B29D 29/00; B29D 29/06; B29K 2021/00; B29K 2021/003; B29K 2021/006; B29K 2075/00; B29K 2705/00; B29L 2031/709; B29L 2031/7092; D07B 1/0646; D07B 1/0653; D07B 7/145; D07B 2201/2079; D07B 2201/208; D07B 2201/2082; D07B 2501/2007; D07B 2501/203
(Continued)

(56) References Cited

U.S. PATENT DOCUMENTS 5,139,874 A * 8/1992 Starinshak ........... D07B 1/0626
428/375
8,365,906 B2   2/2013 Moeschen-Siekmann et al.
(Continued)

OTHER PUBLICATIONS

International Search Report dated Dec. 9, 2016 of international application PCT/EP2016/069551 on which this application is based.

*Primary Examiner* — Leo B Tentoni
(74) *Attorney, Agent, or Firm* — Gregory Adams; David L. Cate

(57) ABSTRACT

A method for manufacturing a tension member, in particular for use in a belt or in a belt segment, having the steps of: preparing a tension member which has a plurality of tension member strands and filling at least some of the intermediate spaces between the tension member strands with a filling material at least at one open end of the tension member, wherein the tension member remains free of the filling material toward the outside.

10 Claims, 2 Drawing Sheets

(51) Int. Cl.
*B29D 29/00* (2006.01)
*B29C 70/72* (2006.01)
*D07B 7/14* (2006.01)
*F16G 3/07* (2006.01)
*D07B 1/06* (2006.01)
*B29L 31/00* (2006.01)
*B29K 705/00* (2006.01)
*B29K 21/00* (2006.01)
*B29K 75/00* (2006.01)
*B29D 29/06* (2006.01)

(52) U.S. Cl.
CPC ............... *F16G 3/07* (2013.01); *B29D 29/06* (2013.01); *B29K 2021/00* (2013.01); *B29K 2021/003* (2013.01); *B29K 2021/006* (2013.01); *B29K 2075/00* (2013.01); *B29K 2705/00* (2013.01); *B29L 2031/709* (2013.01); *B29L 2031/7092* (2013.01); *D07B 1/0646* (2013.01); *D07B 1/0653* (2013.01); *D07B 2201/208* (2013.01); *D07B 2201/2079* (2013.01); *D07B 2201/2082* (2013.01); *D07B 2501/203* (2013.01); *D07B 2501/2007* (2013.01)

(58) Field of Classification Search
USPC .... 264/137, 171.15, 171.16, 171.17, 171.24, 264/331.19
See application file for complete search history.

(56) References Cited

U.S. PATENT DOCUMENTS

| | | |
|---|---|---|
| 8,770,394 B2 | 7/2014 | Huels et al. |
| 9,447,843 B2 | 9/2016 | Moeschen-Siekmann et al. |
| 9,506,526 B2 | 11/2016 | Moeschen-Siekmann et al. |
| 2005/0034375 A1* | 2/2005 | Vanderbeken ............ F16C 1/20 49/507 |
| 2010/0009184 A1* | 1/2010 | Bruyneel ................. D07B 1/16 428/379 |
| 2010/0257834 A1* | 10/2010 | Baekelandt ............ D07B 7/145 57/258 |
| 2013/0225346 A1 | 8/2013 | Gibson |
| 2014/0230194 A1 | 8/2014 | Moeschen-Siekmann et al. |
| 2014/0262696 A1 | 9/2014 | Gibson |
| 2014/0311120 A1* | 10/2014 | Pottier .................... D02G 3/48 57/232 |

* cited by examiner

METHOD FOR MAKING A TENSION MEMBER

CROSS REFERENCE TO RELATED APPLICATIONS

This application is a continuation application of international patent application PCT/EP2016/069551, filed Aug. 18, 2016 designating the United States and claiming priority from German application 10 2015 222 272.1, filed Nov. 12, 2015, and the entire content of both applications is incorporated herein by reference.

BACKGROUND OF THE INVENTION

Various applications are known in which tension members such as, in particular, steel cables are used for transmitting forces in a longitudinal direction. These can be applications in lifting technology such as for example, elevators. Such tension members can be used for example, as shrouds in sailing ships. Such tension members can also be used in built structures such as for example, bridges.

In such applications, the ends of the tension members can be formed for example, by splicing the individual tension member strands as an eyelet in order to guide a fastening means through the eyelet. Alternatively, the ends of the tension members can also be fastened by clamping in or pressing. In this case, the tensile forces are transmitted via the clamped connection or pressed connection essentially as a friction locking connection between the individual strands of the tension member such as for example, the steel cable and the surrounding material of the connecting partner.

It is disadvantageous here that despite the exertion of pressure with very strong forces, air inclusions also usually remain between a number of strands of the tension member. These intermediate spaces of the tension member strands cannot contribute to the friction locking connection of the tension member strands because no contact between the materials can come about in these regions. This can reduce the maximum transmissible force of the clamping connection.

In addition, various products with tension members running in the longitudinal direction, such as in particular steel cables, are known, wherein the tension members serve to transmit the tensile forces in the longitudinal direction. These products include for example, conveyor belts, drive belts, running belts for caterpillar tracked vehicles and the like. In these products, the tension members are usually embedded in an elastic material such as, in particular, an elastomer material which can be, in particular, a vulcanized rubber.

Such products are frequently manufactured in a closed endless form or are provided with connecting elements at their open ends in order to be able to close them in an endless fashion at the place of use. In order to close in an endless fashion, the ends of the tension members can be connected to one another by vulcanizing the elastic material. However, it is alternatively also known to connect the open ends to one another or an open end to a connecting element by means of a friction locking clamped connection or pressed connection.

U.S. Pat. No. 8,365,906 B2 relates to a conveyor belt with a tension member layer composed of steel cables running in parallel. The conveyor belt has at each end a hinge-like formation for coupling to another belt end. The partial hinges each have a hinge bolt, onto which an integrated clamping plate is formed in each case. The integrated clamping plate is let into one of the belt outer surfaces of the conveyor belt. On the opposite belt outer surface, a corresponding, separate clamping plate is embedded in each case in the rubber covering layer there. The respective clamping plates of each partial hinge clamp the respective thickness-reduced belt end securely between them, with the result that the belt ends made of elastomer material can be secured by being clamped in with the embedded steel cable end between the clamping plate and the hinge bolt.

It is disadvantageous here that the clamped connection of the belt ends between the clamping plates is exerted via the elastomer material onto the tension members embedded there. In this context, the elastic material can have a weakening effect on this clamped connection because it completely surrounds the tension members from the outside and can move away laterally from the clamping force in an elastic fashion. In other words, the rubber sheath of the ends of the tension members can act like a sliding layer, which can significantly reduce the maximum clamping force of the clamped connection or pressed connection.

U.S. Pat. No. 8,770,394 B2 relates to a conveyor belt with a tension member layer composed of steel cables running in parallel. The conveyor belt has at each end a hinge-like formation for coupling to another belt end. The partial hinges each have a hinge bolt, onto each of which an offset hinge plate is integrally formed. The ends of the steel cords are inserted into corresponding longitudinal bores in the hinge plate and are fixed in a positionally secure manner there by pressing the hinge plate.

U.S. Pat. No. 9,447,843 B2 relates to a belt or a belt segment having steel cables running substantially in the longitudinal direction of the belt or belt segment and arranged substantially parallel to one another. The belt or the belt segment has at least one open end. The belt or the belt segment has at the open end a fastening device which is connected to at least some of the steel cables by clamping.

U.S. Pat. No. 9,506,526 B2 relates to a belt end body or belt segment end body with an arrangement for coupling to a further corresponding belt end body or belt segment end body and a plurality of clamping openings and clamped cutouts for the clamped reception of tension members of a belt or belt segment, wherein the coupling-together arrangement and the clamping openings are located essentially opposite one another in the longitudinal direction. The belt end body or belt segment end body is constructed such that the unclamped regions of the clamped reinforcing members are always in the neutral phase during operation.

The conveyor belts or belts described above can be manufactured by embedding the tension members in the elastomer material of the conveyor belt or belt over the entire length of the conveyor belt, and vulcanizing them in there. If the tension members are to be used to connect the conveyor belt by a clamped connection as described above, the tension member ends are to be exposed again by for example, cutting away or scratching away the vulcanized material. This not only means a further time-consuming and strenuous working step, which usually has to be carried out manually, but also can lead to damage to the tension members or the tension member strands.

Alternatively, the ends of the tension members can be left exposed during the vulcanization, in order to be able to use the tension member ends for pressing via a clamped connection as described above. In this way, the working step of the disadvantageous removal of the elastomer material after the vulcanization of the tension member ends can be avoided, which can save time and expenditure and avoid damage. However, it is disadvantageous here that in this case air inclusions can continue to be formed between the individual strands of the tension members, with the result that clamping forces cannot be transmitted at these locations in the intermediate spaces of the tension member strands.

In order to avoid such air occlusions between the individual strands of the tension members, the pressing force could be increased, which means, however, additional expenditure and is possible only with correspondingly strong pressing. Very strong pressing can also lead to damage to the strands of the tension members. As a result, the pressing force can be limited, as result of which the securing force of such pressed connections is coincidentally limited. This can limit the use of pressed tension members to applications with relatively low tensile forces.

SUMMARY OF THE INVENTION

It is an object of the present invention to provide a method for manufacturing a tension member of the type described in the beginning, with the result that the clamping effect between the tension member strands can be improved. At least, an alternative method for the known manufacture of a tension member is to be made available.

The object can, for example, be achieved via a method for making a tension member. The method includes the steps of: preparing a tension member which has a plurality of tension member strands defining intermediate spaces between the tension member strands; and, filling at least some of the intermediate spaces with a filling material at least at an open end of the tension member, wherein the tension member remains free of the filling material toward the outside.

The object can, for example, further be achieved via a belt or a belt segment defining a longitudinal direction. The belt or belt segment includes: at least one tension member which runs essentially in the longitudinal direction; the at least one tension member having a plurality of tension member strands; the tension member strands defining intermediate spaces between each other and an outside; the at least one tension member having an open end; a filling material having been filled into at least some of the intermediate spaces from the open end; and, the tension member being free of the filling material toward the outside.

An embodiment relates to a method for manufacturing a tension member, in particular for use in a belt or in a belt segment, including the step of:

preparing a tension member which has a plurality of tension member strands.

The method is characterized by filling at least some of the intermediate spaces between the tension member strands with a filling material at least at an open end of the tension member, wherein the tension member remains free of the filling material toward the outside.

The intermediate spaces are to be understood as the cavities which can be formed between the individual strands of the tension member. This can be done, for example, by virtue of the strands having a circular cross-section, with the result that the individual strands which are twisted together to form the tension member can have cavities between them in which there is no contact between the strands.

The tension member remaining exposed toward the outside can mean that afterward there is no need to remove any filling material or other material, in order to merely fill the intermediate spaces between the tension member strands with the filling material. This would mean additional expenditure, and the subsequent removal could lead to damage to the tension member strands. In other words, the fact that the tension member remains exposed means that generally the material of the tension member or of the tension member strands reaches the outside and can therefore be available as a contact partner during the pressing or clamping process.

In this context, an aspect of the present invention is based on the realization that the strength of the connection of a fastening device or the like and a tension member can be dependent on various factors. One of these factors can be the intermediate spaces between the tension member strands into which the strands can move away during pressing, with the result that they are pressed less strongly. In addition, force cannot be transmitted between the individual strands at the locations of the air inclusions between the strands, which can also weaken the pressed connection or clamped connection.

It is therefore desirable for the pressed connection or clamped connection to be strong as a whole and to be as far as possible in the range of the breaking strength of the tension member, so that the pressed connection or clamped connection does not constitute the weak point of the transmission of tensile force.

This can be achieved in that the strength of the pressed connection or clamped connection is increased. This can be achieved in that the intermediate spaces between the strands are filled at least partially with a filling material. As a result, the strands can be pressed more strongly together. In addition, better transmission of force between the strands can be achieved than has been possible hitherto via the air which is usually occluded there. As result, an improvement in the transmission of force between the strands of the tensile member and the fastening device can be achieved.

This effect also has the advantage that during the pressing process the strands cannot move away into the cavities in the tension member and yield to the pressing process. In other words, the support by the filling material prevents the strands from deforming. As a result, the structure of the outside of the tension member can be retained. The geometry of the surface of the tension member can also contribute both to the frictional locking and to better positive locking of the pressing process. It is also advantageous that in this way the possible damage to individual strands during the pressing process can be reduced.

In this context it is also advantageous that the filling of the intermediate spaces of the tension member can increase the adhesive friction between the individual tension member strands or between the tension member and the fastening device.

It is also advantageous that the strength of the pressed connection or clamped connection can be increased without the length of the connection having to be increased to achieve this. This can be advantageous, in particular, in the case of applications with limited deflection radii of conveyor belts.

It is also advantageous that by avoiding air inclusions and cavities between the tension member strands the possibility of corrosion occurring at these locations can be avoided or reduced.

This method can usually be implemented in customary molding and vulcanization processes such as for example, during the manufacture of steel cable transportation belts. In this context, the tension members are placed in the mold or press and the intermediate spaces there are at least partially filled with the filling material, which can then be solidified in the mold or press so that the filling material can be securely held in the intermediate spaces between the strands. In order to bring about the pressed connection, the tension member can then be pressed with a sleeve, a pressed joint or some other fastening device.

According to an aspect of the present invention, the filling material is an elastic but incompressible material. This can have the advantage that by virtue of such a filling material the flexibility of the tension member in the bending region, that is, outside the pressing process, can be retained. In this way, buckling and as a result damage to the tension members can be avoided. It is also advantageous that it is also possible to increase the tear-out force with the same degree of deformation, and the same tear-out force can be generated with a lower degree of deformation and therefore with a higher degree of flexibility.

The filling material is also preferably adhesive. It is advantageous here that in this way a strong adhesion effect can be achieved between the contact partners.

According to an embodiment, the filling material is an elastomer material. The elastomer filling material can be, for example, vulcanized rubber. For this purpose, the intermediate spaces of the tension member strands can be filled with an elastomer filling material and then vulcanized. It is advantageous here that a vulcanized elastomer material can be extremely incompressible, in comparison with steel. As a result, in particular in the combination with tension member strands made of steel it is possible to achieve a significantly improved pressing effect between them. At the same time, damage to the strands during the pressing process can be reduced or avoided as a result of the flexibility of the elastomer material.

According to an embodiment, the filling material is a polyurethane. Depending on the application, thermoplastic or cross-linked polymers can be used here. As a result, comparable effects to those with a rubber-based elastomer can be achieved in an alternative way. Vulcanized rubber and polyurethanes can have the advantage, in contrast to other conceivable filling materials, that a strong binding to the tension member can be formed and immediate or later displacement of the filling material can be prevented.

According to a further aspect of the present invention, the intermediate spaces between the tension member strands are filled, only at the open end of the tension member, with the filling material at least partially as far in the longitudinal direction as the open end is to be used for connecting by clamping. In this way, the expenditure on filling the intermediate spaces of the tension member can be limited to the region where the advantageous effects are to be used later in the case of a clamped connection. The advantages which are brought about as a result can therefore be used with the lowest possible expenditure.

According to an embodiment, all the intermediate spaces of the tension member strands are completely filled with the filling material. In this way, the advantageous effect can be maximized.

According to a further aspect of the present invention, the tension member is a steel cable. In this way, high tensile forces can be transmitted in the longitudinal direction with a small cross-section of the tension member.

The present invention also relates to a belt or a belt segment having at least one tension member which runs essentially in the longitudinal direction of the belt or of the belt segment. The belt segment has been manufactured via a method as described above. In this way, the advantages described above of a tension member manufactured in such a way can also be used in a belt or belt segment.

According to an embodiment, the belt or the belt segment has at least one fastening device which is connected to one open end of the tension member by clamping. In this way, the belt or the belt segment can be fastened using a fastening device, via a clamping process or pressing process which has been improved, as a function of the application.

According to an embodiment, a plurality of tension members which run essentially in the longitudinal direction of the belt or of the belt segment and are arranged essentially parallel to one another are provided. In this way, the forces which can be transmitted via the tension members can be increased.

BRIEF DESCRIPTION OF THE DRAWINGS

The invention will now be described with reference to the drawings wherein.

DESCRIPTION OF THE PREFERRED
EMBODIMENTS OF THE INVENTION

Figure 1:
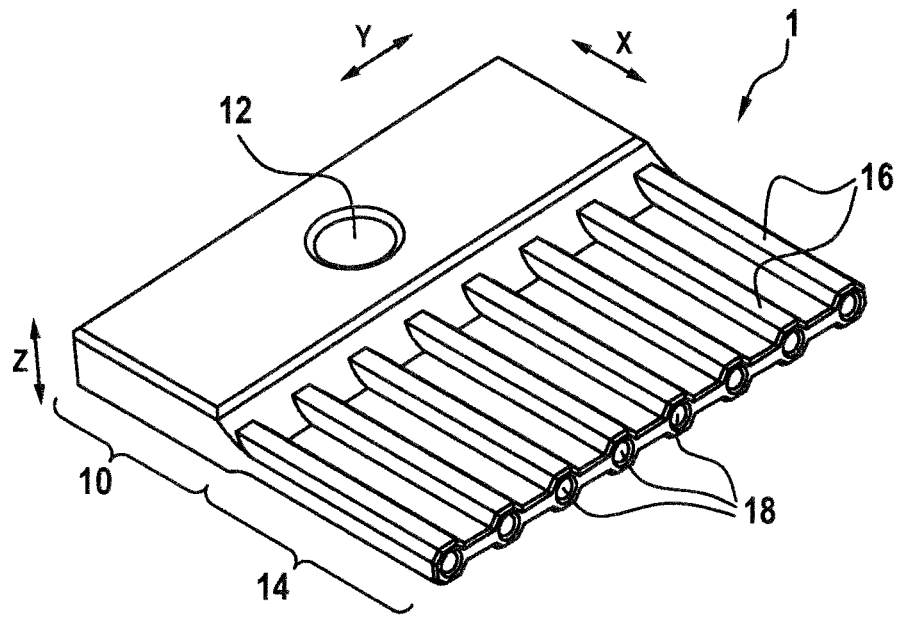
FIG. 1 shows a perspective schematic illustration of a fastening device for receiving a tension member.
Figure 2:
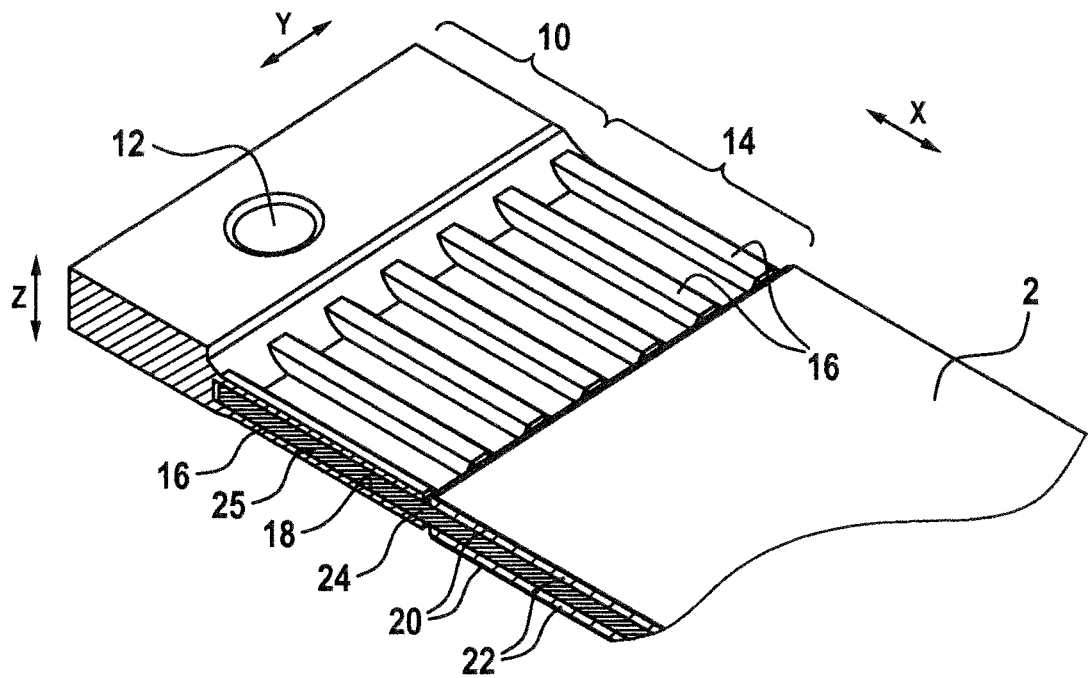
FIG. 2 shows a perspective schematic illustration of the fastening device in FIG. 1 with pressed tension members.

FIG. 1 shows a perspective schematic illustration of a fastening device 1 for receiving a tension member 24. FIG. 2 shows a perspective schematic illustration of the fastening device 1 in FIG. 1 with pressed tension members 24. The arrangement of the fastening device 1 and the belt 2 or the belt segment 2, respectively, extends substantially in a longitudinal direction X which can also be referred to as the depth X. A transverse direction Y, which can also be referred to as the width Y, extends perpendicularly thereto. A perpendicular direction Z, which can also be referred to as the height Z, extends perpendicularly with respect to the longitudinal direction X and perpendicularly with respect to the transverse direction Y.

The fastening device 1 has a head region 10 in which a connecting element 12 in the form of a cutout 12 is arranged. The fastening device 1 can be connected to other bodies via this cutout 12. The fastening device 1 also has a clamping region 14 in which a plurality of clamping webs 16, which are arranged parallel to one another in the longitudinal direction X and which are spaced apart from one another in the transverse direction Y are formed. The individual clamping webs 16 each have a longitudinal bore 18 in the longitudinal direction X, see for example, FIG. 1.

The belt 2 or the belt segment 2 has a rubber covering layer 20 respectively at the top and the bottom in the height Z, which rubber covering layers 20 enclose a core rubber layer 22 between them. A plurality of tension members 24 in the form of steel cables 24 are embedded in the elastomer material in the core rubber layer 22. The steel cables 24 run in the longitudinal direction X, and are spaced apart from one another in the transverse direction Y. The tension member ends 25 or steel cable ends 25 project with their open ends in the longitudinal direction X from the core rubber layer 22 and are each individually pressed in the longitudinal bores 18 of the fastening device 1, see for example, FIG. 2.

Figure 3:
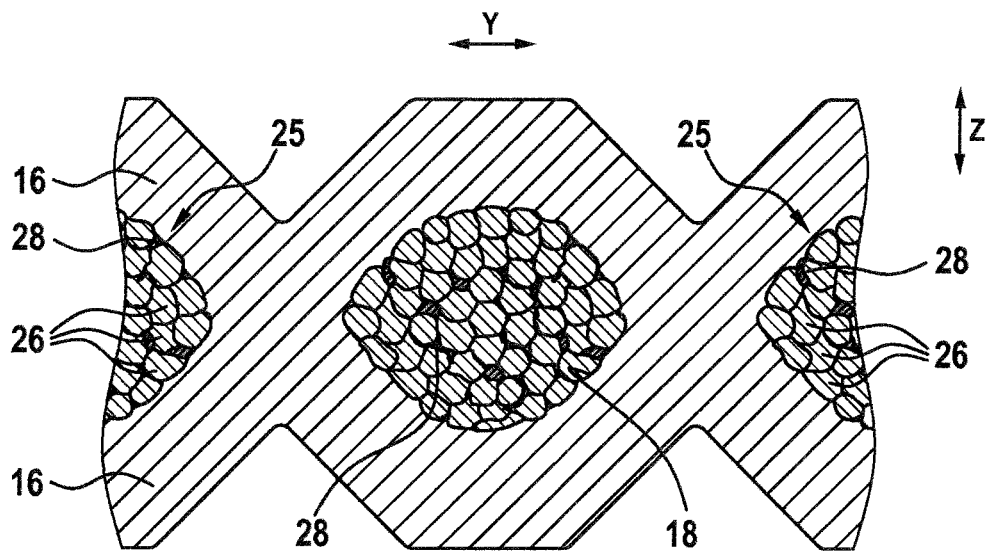
FIG. 3 shows an illustration of a cross-section through the fastening device in FIG. 2; and, FIG. 4 shows an illustration of the detail of FIG. 3.
Figure 4:
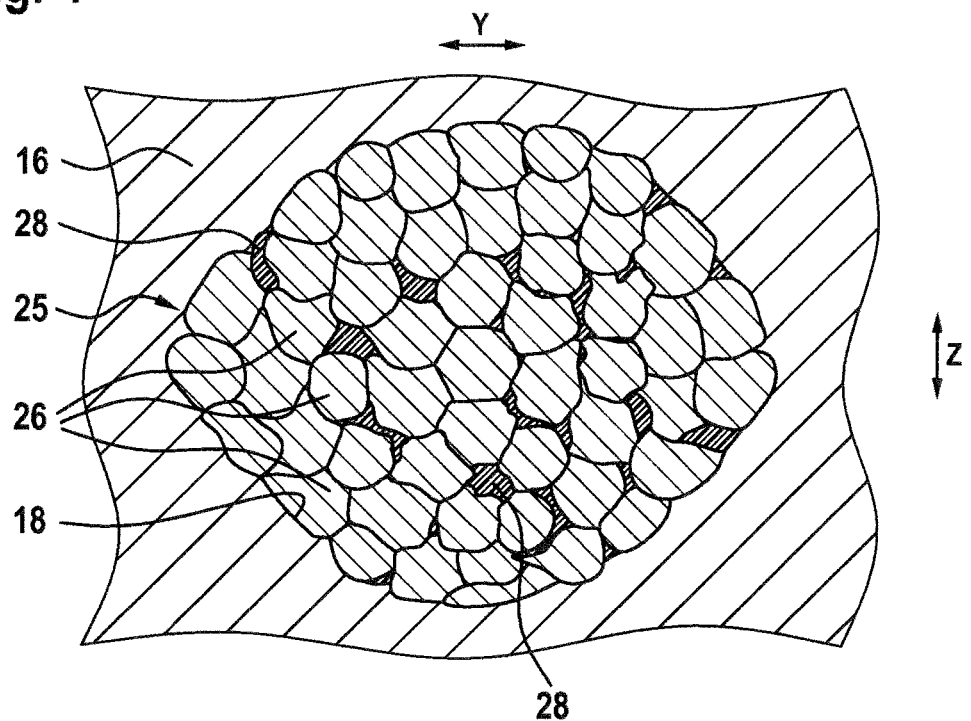

FIG. 3 shows an illustration of a cross-section through the fastening device 1 in FIG. 2. FIG. 4 shows an illustration of the detail of FIG. 3. In these two cross-sectional illustrations, the individual tension member strands 26 or steel cable strands 26 of the tension members 24 or steel cables 24 can each be seen, which tension member strands 26 or steel cable strands 26 are twisted together to form the tension members 24 or steel cables 24.

According to the invention, the intermediate spaces between the steel cable strands 26 are filled with a filling material 28 in the form of an elastomer material 28. In this way, the previously customary inclusions of air between the steel cable strands 26 are avoided. In addition, the elastomer material 28 even has a comparability incompressibility to the steel cable strands 26, with the result that the pressing effect between the individual steel cable strands 26 can be significantly enhanced by the elastomer filling 28. Furthermore, strong binding of the elastomer material 28 to the steel cable strands 26 can be achieved. At the same time, the elasticity of the elastomer filling 28 makes it possible to ensure that the steel cable strands 26 are prevented from buckling during the pressing process, which could lead to damage to the steel cable strands 26.

It is understood that the foregoing description is that of the preferred embodiments of the invention and that various changes and modifications may be made thereto without departing from the spirit and scope of the invention as defined in the appended claims.

LIST OF REFERENCE NUMBERS

Part Of The Specification

X Longitudinal direction, depth
Y Transverse direction, width
Z Perpendicular direction, height
1 Fastening device
10 Head region of the fastening device 1
12 Connection element, or cutout of the head piece 10
14 Clamping region of the fastening device 1
16 Clamping webs of the clamping region 14
18 Longitudinal bores of the clamping region 14
2 Belt or belt segment
20 Rubber covering layer, upper and lower
22 Core rubber layer
24 Tension member, steel cables
25 Open tension member end, open steel cable end
26 Tension member strands, steel cable strands
28 Filling material, elastomer material

What is claimed is:

1. A method for making a tension member, the method comprising the steps of:
   preparing a tension member which has a plurality of tension member strands defining intermediate spaces between individual strands of the plurality of the tension member strands; and,
   filling at least some of the intermediate spaces with a filling material at least at an open end of the tension member,
   wherein the tension member remains free of the filling material toward the outside;
   the filling material comprised of an elastomer material.

2. The method of claim 1, wherein the filling material is an elastic but incompressible material.

3. The method of claim 1, wherein:
   the tension member has an open end and defines a longitudinal direction (X); and,
   the intermediate spaces, only at the open end of the tension member, are, at least partially as far in the longitudinal direction (X) as the open end is, to be used for connecting by clamping, filled with the filling material.

4. The method of claim 1, wherein all the intermediate spaces of the tension member strands are completely filled with the filling material.

5. The method of claim 1, wherein the tension member is a steel cable.

6. The method of claim 1, wherein the tension member is for a belt or a belt segment.

7. The method of claim 1, further comprising performing a pressing process and the elastomer material is configured to prevent buckling during the pressing process.

8. The method of claim 1, further comprising pressing the formed tension member into a bore of a clamping web of fastening device.

9. The method of claim 8, further comprising clamping the tension member into the bore.

10. The method of claim 9, further comprising connecting the fastening device to a body via a cutout.

* * * * *